No. 662,278. Patented Nov. 20, 1900.
C. W. LEVALLEY.
AURAL BATTERY.
(Application filed July 17, 1900.)
(No Model.)
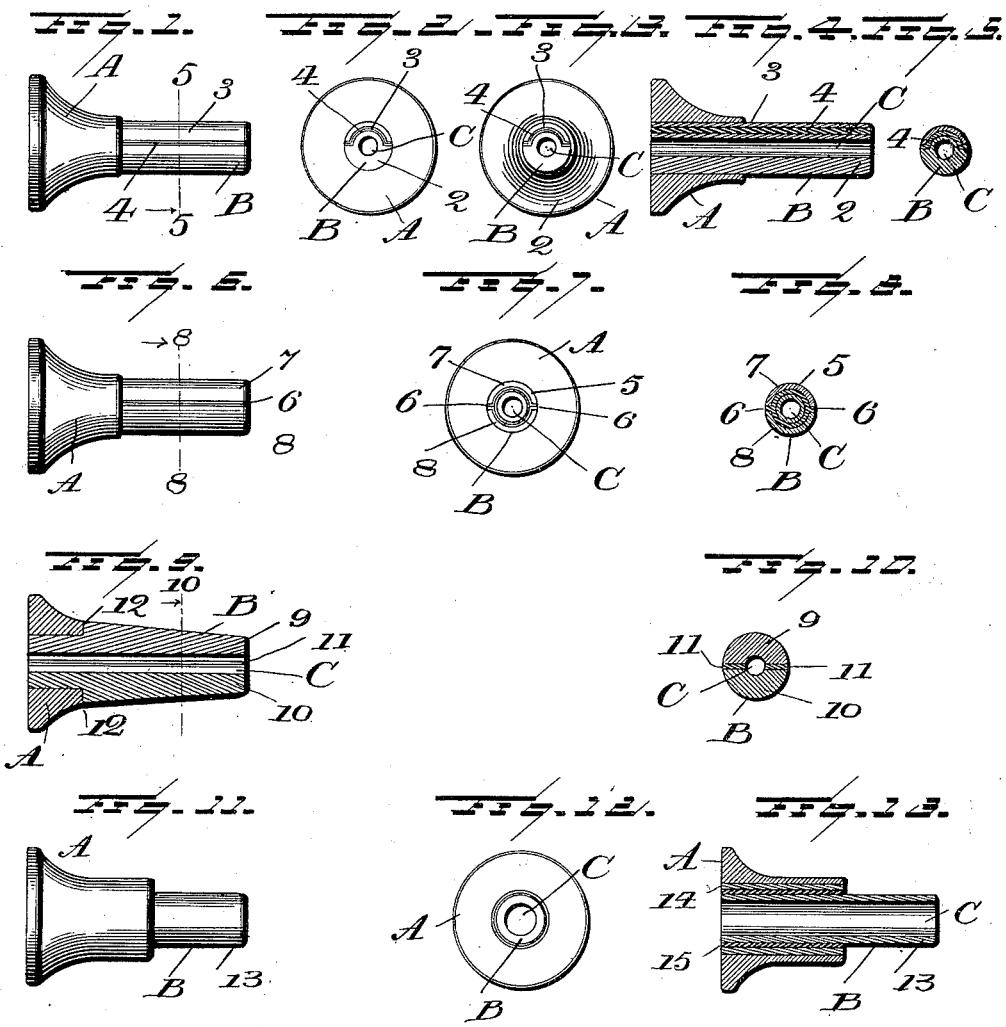
WITNESSES:
INVENTOR
Christopher W. Levalley
BY
Attorney

UNITED STATES PATENT OFFICE.

CHRISTOPHER W. LEVALLEY, OF MILWAUKEE, WISCONSIN.

AURAL BATTERY.

SPECIFICATION forming part of Letters Patent No. 662,278, dated November 20, 1900.

Application filed July 17, 1900. Serial No. 23,947. (No model.)

*To all whom it may concern:*

Be it known that I, CHRISTOPHER W. LE-VALLEY, a citizen of the United States, residing at Milwaukee, in the county of Milwaukee and State of Wisconsin, have invented new and useful Improvements in Aural Batteries, of which the following is a specification.

My invention has for its object to produce an aural or ear battery which is adapted for use in the treatment of deafness and other disorders of the ear, which battery may be worn without inconvenience to the user and without attracting attention and which while being effective as a generator of electricity will not seriously interfere with the entrance of air into the ear while the battery is in use or interfere with hearing at such time.

The invention consists of certain improvements in a battery of this character, which I will now proceed to point out and which are illustrated in the companying drawings.

The drawings illustrate several forms of my invention.

Figure 1 is a side view of a form of my invention which for some purposes I prefer over all others. Fig. 2 is an elevation of the outer end, Fig. 3 is an elevation of the inner end, Fig. 4 is a longitudinal section, and Fig. 5 is a cross-section on the line 5 5, of the battery shown in Fig. 1. Fig. 6 is a side view of another battery embodying my improvements. Fig. 7 is an outer end view, and Fig. 8 is a cross-sectional view on the line 8 8, of the battery shown in Fig. 6. Fig. 9 is a longitudinal sectional view of still another battery embodying my improvements, and Fig. 10 is a cross-sectional view of the same on the line 10 10 of Fig. 9. Fig. 11 is a side view of still another form of battery embodying my improvements. Fig. 12 is an outer end view, and Fig. 13 is a longitudinal section of the same.

All the forms of battery shown possess certain elements of construction in common—such as a head A at one end adapted to prevent the battery when in use from entering too far into the ear, and a stem B, adapted to enter the cavity of the ear, which stem is formed in whole or in part of the elements which constitute the battery and of insulating material between and separating such elements. Further, each form of my invention is hollow from end to end or has an aperture extending continuously longitudinally through the stem and through the head in order to permit free entrance of air and of sound to the ear-cavity when the battery is in use. This aperture or cavity throughout the drawings is uniformly represented by the letter C.

Referring now particularly to the specific form of my invention illustrated in Figs. 1 to 5, 2 indicates the negative element of the battery, 3 the positive element, and 4 the insulating material between them. The negative element 2 is formed of a hollow cylindrical piece of carbon and the positive element 3 of a piece of zinc of partispherical form or shape, which partially embraces the carbon element 2, being, however, completely insulated therefrom by the material 4. The insulating substance 4 is preferably formed of a material which will act as an absorbent of the liquid which is used to excite the battery. The head A of the battery is preferably formed of some substance which is a non-conductor of electricity, such as vulcanite, and it is forced over one end of the tube, which is formed by the two battery elements 2 and 3 and the insulating material between them, and which parts it therefore serves to securely hold together.

As represented in Figs. 2, 3, and 5, the cylindrical positive element may be cut down upon the side over which the element 3 is fitted in order that the stem or tube formed may more nearly approximate a perfect cylinder.

When it is desired to use a battery of the character described, it is dipped into a suitable liquid, such as acidulated water, until the material 4 has absorbed all that it will take up. The device is then wiped dry and inserted into the ear, and, as will be readily understood, a mild current of electricity is generated, and this acts directly upon the nerves and membranes of the ear in a beneficial way. The moist secretions of the ear-cavity will also serve to excite the battery to some extent. The device can be used without discomfort at night as well as during the waking hours. Among the advantages which are incident to this particular form of ear-battery are the following: By forming the negative element of the stem of the battery of carbon there is no corrosive action, which might take place to a slight extent were copper employed as the negative element. By forming the aperture C entirely within one of the elements I make a battery which is more easily assembled and insure against the collapse or closing of the aperture by the parts of the stem coming together.

The form of invention shown in Figs. 6 to 8 differs in several particulars from that shown in the views already described. Referring to these views, 5 represents a small tube which forms the core of the stem of the battery and through which passes the aperture C. This tube may be formed of a material to constitute one of the battery elements or it may be formed of some non-conducting material. Surrounding this tube is the insulating material, which is preferably of an absorbent nature. 7 and 8 indicate the battery elements. They are preferably semicylindrical in shape and are arranged to embrace upon opposite sides the insulating material 6 surrounding the central tube 5. Their edges come close together, but do not touch, being separated by the insulating material. The head B fits over one end of the stem, which is formed of the parts 5, 6, 7, and 8, and holds them together.

In the form of my invention illustrated in Figs. 9 and 10, 9 indicates the positive element or electrode of the battery, formed of zinc, and 10 the negative element or electrode, formed of brass. These two parts are separated by insulating material 11, arranged between their edges. In this form of the battery a perforated tube, such as is used in the two forms of the invention already described, is not employed. The aperture C is arranged between the two parts 9 and 10, which are so shaped that when brought together edge to edge, with the insulating material 11 separating them, a hollow cylindrical or tapering stem B is formed. The head A is of insulating material and fits over the outer ends of the pieces 9 and 10, holding them together and in proper relation to each other. The ends of the elements or pieces 9 and 10 over which the head A is fitted are preferably reduced and shouldered, as indicated at 12, to insure a better attachment of the head to the stem.

In the form of invention shown in Figs. 11 to 13 the positive element of the battery consists of a tube 13, of zinc. The negative element 14 is also tubular and fits over the tube 13 throughout a portion of its length, being separated therefrom by the insulating material 15. In this form of my invention the head A is integral with the negative element 14 of the battery. It is evident that the arrangement of the positive and negative elements might be reversed—that is to say, the inner tube might be of copper or some negative element and the outer tube and head of a material which would form the positive element. In this case, as in the others, I prefer that the insulation should be of absorbent material.

In each form of my invention shown the head A is of a bell shape, and this is the form which I prefer to use in practice, as it permits the head to be forced over the outer end of the stem, upon which it may be held by frictional contact alone, and by reason of its shape—that is to say, having its inner portion tapering, so that there is no abrupt shoulder between the head and the stem where the head terminates at its inner end—the battery when inserted into the ear fits closely the cavity of the ear without causing discomfort and is held in place with sufficient security.

It will be readily understood that my invention whether carried into effect in one form or the other, as described, results in the production of a convenient form of ear-battery, which is hollow from end to end and has at one end an enlarged head, while its other end is formed into a stem which is composed of the elements which constitute the battery and an insulating material separating them.

Other forms of my invention might be devised; but those which are shown and have been described are sufficient to illustrate it and show that it may be variously modified without departing from the essential features of its construction.

Having described my invention, what I claim, and desire to secure by Letters Patent, is—

1. An ear-battery which is hollow from end to end having a tubular stem portion adapted to be inserted into the ear-cavity, the stem being composed of the materials which constitute the elements of the battery, insulating materials separating the said elements, and an enlarged head of substantially bell shape at the outer end of the stem and fitting over the same, substantially as set forth.

2. An ear-battery comprising a hollow stem portion formed of two pieces of material adapted to constitute the elements of a battery, and insulating material separating said pieces, and a head of non-conducting material fitted over one end of the said stem portion, and operating to hold the parts of the stem portion of the battery together securely, substantially as set forth.

3. An ear-battery formed with a head and with a stem portion adapted to be inserted into the cavity of the ear, the said stem portion being composed of two separate pieces of material which constitute the elements of the battery, each of the said pieces of material extending the full length of the stem, constituting approximately one-half of the circumference of the stem portion, and being separated from the other by insulating material, substantially as set forth.

4. An ear-battery which is hollow longitudinally and has at one end an enlarged head, and a stem portion extending therefrom, the stem portion being formed of a piece of tubular material which constitutes one element of the battery and another piece of particylindrical material which constitutes the other end of the battery and which overlies the said tubular piece on one side and is separated therefrom by insulating material, substantially as set forth.

5. An ear-battery comprising a cylindrical piece of carbon, 2, a particylindrical piece of zinc, 3, insulating material between them, these parts being formed into a stem, and a head A of non-conducting material fitted closely over one end of the said stem, substantially as set forth.

CHRISTOPHER W. LEVALLEY.

Witnesses:
   W. C. FRYE,
   V. I. KLOFANDA.